United States Patent
Yamamoto

(10) Patent No.: US 7,041,002 B2
(45) Date of Patent: May 9, 2006

(54) GOLF CLUB HEAD

(75) Inventor: Akio Yamamoto, Kobe (JP)

(73) Assignee: SRI Sports Limited, Kobe (JP)

( * ) Notice: Subject to any disclaimer, the term of this patent is extended or adjusted under 35 U.S.C. 154(b) by 0 days.

(21) Appl. No.: 10/699,772

(22) Filed: Nov. 4, 2003

(65) Prior Publication Data
US 2004/0092334 A1 May 13, 2004

(30) Foreign Application Priority Data
Nov. 5, 2002 (JP) ............... 2002-321416

(51) Int. Cl.
A63B 53/04 (2006.01)

(52) U.S. Cl. ............ 473/324; 473/342; 473/349; 473/350

(58) Field of Classification Search ......... 473/324–350
See application file for complete search history.

(56) References Cited

U.S. PATENT DOCUMENTS

| | | | |
|---|---|---|---|
| 4,314,863 A * | 2/1982 | McCormick | 420/61 |
| 5,089,067 A * | 2/1992 | Schumacher | 148/325 |
| 5,176,384 A * | 1/1993 | Sata et al. | 473/329 |
| 5,524,698 A * | 6/1996 | Chen et al. | 164/72 |
| 5,569,337 A * | 10/1996 | Yoshida et al. | 148/325 |
| 5,807,189 A * | 9/1998 | Martin et al. | 473/342 |
| 5,899,818 A * | 5/1999 | Zider et al. | 473/324 |
| 6,334,817 B1 * | 1/2002 | Ezawa et al. | 473/324 |
| 6,494,789 B1 * | 12/2002 | Chen | 473/324 |
| 6,630,103 B1 * | 10/2003 | Martin et al. | 420/38 |
| 6,716,291 B1 * | 4/2004 | Woods | 148/325 |
| 2004/0042926 A1 * | 3/2004 | Shimizu | 420/38 |

* cited by examiner

Primary Examiner—Sebastiano Passaniti
(74) Attorney, Agent, or Firm—Birch, Stewart, Kolasch & Birch, LLP

(57) ABSTRACT

A golf club head comprises a part made of a martensitic iron alloy which has: a nickel (Ni) content of from 9.0 to 12.0 weight %; a chromium (Cr) content of from 11.0 to 12.5 weight %; a titanium (Ti) content of from 1.5 to 1.8 weight %; a molybdenum (Mo) content of from 0.75 to 1.2 weight %; a carbon (C) content of not more than 0.05 weight %; a phosphorus (P) content of not more than 0.015 weight %; a silicon (Si) content of not more than 0.25 weight %; a magnesium (Mg) content of not more than 0.25 weight %; and a sulfur (S) content of not more than 0.01 weight %.

8 Claims, 1 Drawing Sheet

GOLF CLUB HEAD

This nonprovisional application claims priority under 35 U.S.C. § 119(a) on Patent Application No. 2002-321416 filed in JAPAN on Nov. 5, 2002, the entire contents of which are hereby incorporated by reference.

BACKGROUND OF THE INVENTION

The present invention relates to a golf club head, more particularly to a metallic part made of a martensitic iron alloy.

In recent years, in order to form various parts of golf club heads, titanium alloys are widely used for their excellent physical properties. Especially, the use of a titanium alloy in the club face portion of the wood-type hollow golf club heads is very effective for increasing the restitution coefficient. Therefore, titanium alloys are nowadays commonly used in the face portion of the large-sized wood-type hollow heads in particular.

Titanium is however, a costly material and it has very high activity. Therefore, there are many restrictions in manufacturing processes. Thus, increase in the production cost and material cost is inevitable.

SUMMARY OF THE INVENTION

It is therefore, an object of the present invention to provide a golf club head which can provide comparable results to titanium head in spite of low cost when compared with titanium head.

According to the present invention, a golf club head comprises a part made of a martensitic iron alloy which has: a nickel (Ni) content of from 9.0 to 12.0 weight %; a chromium (Cr) content of from 11.0 to 12.5 weight %; a titanium (Ti) content of from 1.5 to 1.8 weight %; a molybdenum (Mo) content of from 0.75 to 1.2 weight %; a carbon (C) content of not more than 0.05 weight %; a phosphorus (P) content of not more than 0.015 weight %; a silicon (Si) content of not more than 0.25 weight %; a magnesium (Mg) content of not more than 0.25 weight %; and a sulfur (S) content of not more than 0.01 weight %.

DESCRIPTION OF THE PREFERRED EMBODIMENTS

Figure 1:
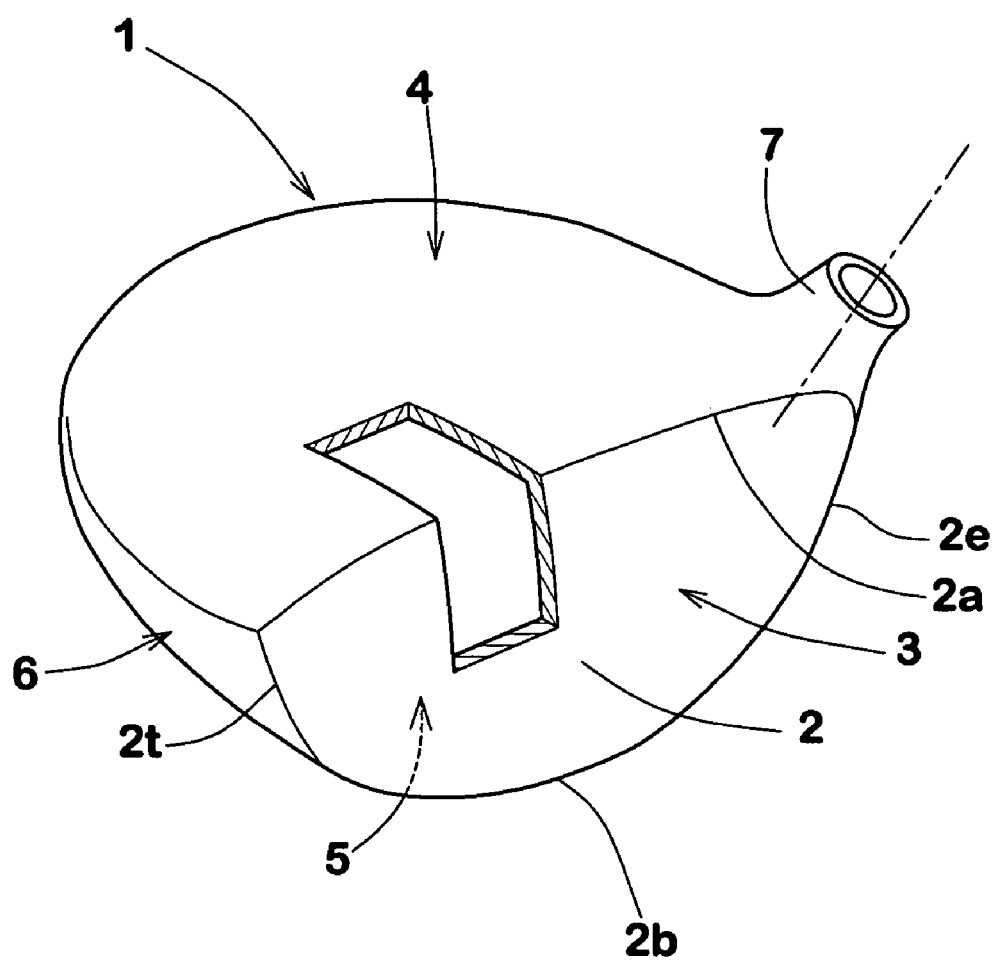
FIG. 1 is a perspective view of a golf club head according to the present invention.

An embodiment of the present invention will now be described in detail in conjunction with the accompanying drawing.

In the drawing, a golf club head 1 according to the present invention is a metal wood-type hollow golf club head.

The wood-type golf club head 1 comprises: a face portion 3 whose front face defines a club face 2 for striking a ball; a crown portion 4 intersecting the club face 2 at the upper edge 2a thereof; a sole portion 5 intersecting the club face 2 at the lower edge 2b thereof; a side portion 6 between the crown portion 4 and sole portion 5 which extends from a toe-side edge 2t to a heel-side edge 2e of the club face 2 through the back face of the club head; and a neck portion 7 to be attached to an end of a club shaft (not shown).

In this embodiment, the club head is formed by welding two parts together, and these two parts are a face plate forming the face portion 3 and an open-front hollow main body forming the remaining portions 4, 5, 6 and 7.

According to the present invention, at least a part of the golf club head 1 is made of at least one kind of the undermentioned martensitic iron alloy. In this embodiment, all the parts, namely, the face plate and hollow main body are each made of the martensitic iron alloy.

In the club head as the finished product, the above-mentioned alloy has martensitic structure which makes up 90% or more, preferably 95% or more of the total.

The martensitic iron alloy has:
a nickel Ni content of from 9.0 to 12.0 weight %,
a chromium Cr content of from 11.0 to 12.5 weight %,
a titanium Ti content of from 1.5 to 1.8 weight %,
a molybdenum Mo content of from 0.75 to 1.2 weight %,
a carbon C content of not more than 0.05 weight %,
a phosphorus P content of not more than 0.015 weight %,
a silicon Si content of not more than 0.25 weight %,
a magnesium Mg contnet of not more than 0.25 weight %, and
a sulfur S content of not more than 0.01 weight %.

Ideally speaking, the remainder of the alloy is iron Fe only, but it is natural that unavoidable impurities are included.

Nickel Ni is absolutely necessary to toughness and strength. If the nickel Ni content is less than 9.0 weight %, the strength and toughness are liable to become insufficient. If the nickel Ni content is more than 12.0 weight %, the martensitic transformation start temperature Ms becomes lowered, and after the undermentioned solution heat treatment, the retained austenite tends to increase. Thus, the nickel Ni content must be within a range of 9.0 to 12.0 weight %, preferably 9.5 to 11.5 weight %, more preferably 10.0 to 11.0 weight %.

Chromium Cr is also essential to corrosion resistance. If the chromium Cr content is less than 11.0 weight %, the corrosion resistance becomes insufficient. If the chromium Cr content is more than 12.5 weight %, δ-ferrite is liable to occur and the toughness will be lost. Therefore, the chromium Cr content must be in a range of from 11.0 to 12.5 weight %, preferably 11.2 to 12.3 weight %, more preferably 11.5 to 12.0 weight %.

If the carbon C content is more than 0.05 weight %, the harness of the martensitic structure increases to decrease the workability and production efficiency of the material, and deteriorate the toughness and corrosion resistance. Thus, the carbon C content must be not more than 0.05 weight %, and preferably, set in a range of less than 0.02 weight %. In this embodiment, the carbon C content is not more than 0.02 weight %.

If the phosphorus P content is more than 0.015 weight % and/or the silicon Si content is more than 0.25 weight %, the alloy will lose necessary ductility and toughness, and workability and production efficiency decrease. In particular, if the silicon Si content is high, silicon Si produces nonmetallic inclusion, e.g. $SiO_2$ and the like which greatly deteriorates the ductility and toughness, and tends to cause fracture. Thus, the silicon Si content must be not more than 0.25 weight %, and the phosphorus P content must be not more than 0.015 weight %.

If the magnesium Mg content is more than 0.25 weight % and/or the sulfur S content is more than 0.01 weight %, the ductility and toughness unfavorably decrease. Thus, the magnesium Mg content must be not more than 0.25 weight %, and the sulfur S content must be not more than 0.01 weight %.

It is especially important for the elements C, P, Si, Mg and S not to exceeds beyond the rerspective upper limitations.

During the undermentioned aging treatment, molybdenum Mo separates out and produces intermetallic compounds such as $Fe_2MO$ and $Ni_3Mo$, which is especially effective for strengthening the iron alloy. If the molybdenum Mo content is less than 0.75 weight %, the strength can not be effectively increased. If the molybdenum Mo content is more than 1.2 weight %, toughness decreases. Thus, the molybdenum Mo content must be in a range of 0.75 to 1.2 weight %.

Titanium Ti is coupled with nickel Ni to produce intermetallic compounds, and as a result the strength of the alloy is greatly increased. Therefore, the ratio (X/Y) of the nickel Ni content X in weight % to the titanium Ti content Y in weight % is set in a range of 5.5 to 7.5, preferably 5.8 to 7.2. It is however, desirable to set the titanium Ti content Y absolutely in a range of from 1.5 to 1.8 weight %.

Using the above-mentioned iron alloy, the objective parts are formed by casting and subsequent quenching to solidify. In this embodiment, lost wax precision casting is employed to form the face plate and hollow main body.

As mentioned above, in the finished state of the head, the iron alloy has martensitic structure which makes up 90% or more, preferably 95% or more of the total.

In order to provide such high-percentage martensitic structure, a solution heat treatment, deep cooling or subzero cooling, and aging treatment are carried out in this sequence after the castings (face plate and main body) are welded together. In other words, these thermal treatments are carried out on the club head, not on the separate parts.

The solution heat treatment is to keep the castings of the alloy at a temperature of from 980 to 1050 degrees C. for a time period of about 60 to about 120 minutes (in this example about 90 minutes) and then the alloy undergos $N_2$ quenching.

The deep cooling is a process to lessen the retained austenite by rapidly cooling the alloy below zero, in practice, down to about −70 or −80 degrees C., immediately after the above-mentioned quenching and keeping the temperature for a time period of about 6 to about 10 hours (in this example 8 hours).

The aging treatment is to keep the iron alloy at a temperature of from 518 to 558 degrees C., preferably 528 to 548 degrees C. for a time period of 3 to 5 hours, preferably 3.5 to 4.5 hours. If the temperature is less than 518 degrees C., the bending Young's modulus increases and the rebound performance of the head tends to decrease. If the temperature is more than 558 degrees C., the strength tends to decrease. If the time period is less than three hours, the aging tends to become insufficient to provide it with necessary strength. If the time period is more than five hours, there is no more advantage.

Such martensitic iron alloy becomes high in the specific tensile strength when compared with martensitic stainless steels. It is therefore, possible to reduce the weight of the part and to increase the size of the head. In case of the face plate for example, it becomes possible to reduce the wall thickness to increase the restitution coefficient of the face portion without sacrificing its durability. By using the martensitic iron alloy instead of costly titanium alloys, it becomes possible to decrease the material cost and production cost, nevertheless, comparable advantageous effects may be obtained. For example, the thickness of the face portion 3 can be reduced to 1.8 to 2.2 mm even in its central region and a high restitution coefficient can be obtained.

Comparison Tests

Club heads for #1 metal wood having a head volume of 300 cc and weight of 200 grams were made. Each club head was made by welding a face plate and open-front hollow main body together as explained above. As the purposes of these tests were comparison of the restitution coefficient and durability of the face portion, an existing lost wax precision casting of SUS630 was used as the hollow main body for convenience sake. The face plates were made, using alloys shown in Table 1 which underwent the aging treatment, deep cooling and aging treatment as shown in Table 1 after welded.

Rebound Performance Test:

The restitution coefficient "e" of the face portion was obtained according to the "Procedure for Measuring the velocity Ratio of a club Head for conformance to Rule 4-1e, Appendix II, Revision 2 (Feb. 8, 1999), United states Golf Association." The test results are shown in Table 1, wherein the larger the value, the better the rebound performance.

Durability Test:

The club heads were attached to identical shafts to make #1 wood clubs. Each club was attached to a swing robot and hit golf balls ("MAXFRI HI-BRID" Sumitomo Rubber Ind., Ltd.) repeatedly at a head speed of 51 m/s. The number of hits until the ball striking face was damaged was counted and shown in Table 1. If there is no damage after 3000 hits, the head was appraised as passable and indicated as "ok" in Table 1.

TABLE 1

| Head | Ex. 1 | Ex. 2 | Ex. 3 | Ref. 1 | Ref. 2 |
|---|---|---|---|---|---|
| Iron alloy Element (wt %) | | | | | |
| C | 0.01 | 0.01 | 0.01 | 0.1 | 0.01 |
| P | 0.01 | 0.01 | 0.01 | 0.01 | 0.01 |
| Si | 0.2 | 0.2 | 0.2 | 0.2 | 0.2 |
| Ni | 10.5 | 10.5 | 10.5 | 5 | 8 |
| Mg | 0.25 | 0.25 | 0.25 | 0.25 | 0.25 |
| S | 0.01 | 0.01 | 0.01 | 0.01 | 0.01 |
| Cr | 11.5 | 11.5 | 11.5 | 11.5 | 11.5 |
| Mo | 1.1 | 1.1 | 1.1 | 5 | 1.1 |
| Ti | 1.6 | 1.6 | 1.6 | 0.1 | 1.6 |
| Solution heat treatment | 980 to 1050 degrees C (90 minutes) then $N_2$ quenching | | | | |
| Deep cooling | −73 degrees C. (8 hours) | | | | |
| Aging treatment | | | | | |
| Temparature (deg. C.) | 540 | 515 | 560 | 540 | 540 |
| Time (hour) | 4 | 4 | 4 | 4 | 4 |
| Bending tensile strength (MPa) | 2167 | 2113 | 1566 | 1320 | 1450 |
| Bending Young's modulus (MPa) | 1778 | 1852 | 1586 | 1432 | 1520 |
| Club face Thickness (mm) | 1.7 | 1.7 | 1.9 | 1.9 | 1.9 |
| Restitution coefficient | 0.865 | 0.863 | 0.857 | 0.862 | 0.858 |
| Durability | ok | ok | ok | 1200 | 1200 |

From the test results, it was confirmed that by using the above-mentioned martensitic iron alloy, it is possible to decrease the thickness of the face portion down to 1.7–1.9 mm to improve the restitution coefficient while maintaining durability at a practical level. The restitution coefficient obtained by the martensitic iron alloy was the same order as the commonly used titanium alloys.

In the above-mentioned embodiment, all the portions 3, 4, 5, 6 and 7 of the head are made of the martensitic iron alloy. But, it is also possible to use another material such as stainless steel in combination with the martensitic iron alloy as in the club heads used in the comparison tests.

The present invention suitably applied to metal wood-type hollow heads, but it is also possible to apply the invention to other types of club heads such as utility-type, iron-type, and patter-type.

The invention claimed is:

1. A golf club head comprising a part made of a martensitic iron alloy which has:
   a nickel (Ni) content of from 9.0 to 12.0 weight %;
   a chromium (Cr) content of from 11.0 to 12.5 weight %;
   a titanium (Ti) content of from 1.5 to 1.8 weight %;
   a molybdenum (Mo) content of from 0.75 to 1.2 weight %;
   a carbon (C) content of not more than 0.05 weight %;
   a phosphorus (P) content of not more than 0.015 weight %;
   a silicon (Si) content of not more than 0.25 weight %;
   a magnesium (Mg) content of not more than 0.25 weight %; and
   a sulfur (S) content of not more than 0.01 weight %, and
   said martensitic iron alloy having martensitic structure which makes up 90% or more of the total weight thereof.

2. The golf club head according to claim 1, wherein the ratio (X/Y) of the nickel (Ni) content X to the titanium (Ti) content Y is in a range of from 5.5 to 7.5.

3. The golf club head according to claim 1, wherein said part is a casting of the martensitic iron alloy.

4. A golf club head according to claim 1 or 3, which is a wood-type hollow club head comprising a face plate joined to a main body, and said part forms the face plate.

5. A golf club head comprising a main body and a face plate forming a club face and joined to the main body, wherein said face plate is made of a martensitic iron alloy having:
   a nickel (Ni) content of from 9.0 to 12.0 weight %;
   a chromium (Cr) content of from 11.0 to 12.5 weight %;
   a titanium (Ti) content of from 1.5 to 1.8 weight %;
   a molybdenum (Mo) content of from 0.75 to 1.2 weight %;
   a carbon (C) content of not more than 0.05 weight %;
   a phosphorus (P) content of not more than 0.015 weight %;
   a silicon (Si) content of not more than 0.25 weight %;
   a magnesium (Mg) content of not more than 0.25 weight %; and
   a sulfur (S) content of not more than 0.01 weight % said martensitic iron alloy having martensitic structure which makes up 90% or more of the total weight thereof.

6. The golf club head according to claim 5, wherein the alloy of the face plate is provided with martensitic structure through thermal treatments which include:
   a solution heat treatment made at a temperature of from 980 to 1050 degrees C. and accompanied by subsequent quenching;
   deep cooling made immediately after the quenching;
   and an aging treatment made at a temperature of from 518 to 558 degrees C.

7. The golf club head according to claim 5, wherein the main body is also made of the martensitic iron alloy.

8. The golf club head according to claim 6, wherein the main body is also made of the martensitic iron alloy, and the alloy of the main body is provided with martensitic structure through thermal treatments which include:
   a solution heat treatment made at a temperature of from 980 to 1050 degrees C. and accompanied by subsequent quenching;
   deep cooling made immediately after the quenching; and
   an aging treatment made at a temperature of from 518 to 558 degrees C.

* * * * *